(12) United States Patent
Kobayashi et al.

(10) Patent No.: US 12,126,037 B2
(45) Date of Patent: Oct. 22, 2024

(54) BATTERY INCLUDING POWER GENERATION ELEMENT AND SEALING MEMBER CONTAINING INSULTING MATERIAL AND ZEOLITE PARTICLES

(71) Applicant: Panasonic Intellectual Property Management Co., Ltd., Osaka (JP)

(72) Inventors: Nobuyuki Kobayashi, Hyogo (JP); Yasutaka Tsutsui, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 554 days.

(21) Appl. No.: 17/396,642

(22) Filed: Aug. 6, 2021

(65) Prior Publication Data

US 2021/0367298 A1    Nov. 25, 2021

Related U.S. Application Data

(63) Continuation of application No. PCT/JP2020/001200, filed on Jan. 16, 2020.

(30) Foreign Application Priority Data

Mar. 29, 2019    (JP) .................. 2019-069045

(51) Int. Cl.
*H01M 50/195* (2021.01)
*H01M 50/186* (2021.01)
(Continued)

(52) U.S. Cl.
CPC ....... *H01M 50/195* (2021.01); *H01M 50/186* (2021.01); *H01M 50/191* (2021.01); *H01M 50/176* (2021.01); *H01M 50/193* (2021.01); *H01M 50/409* (2021.01); *H01M 50/489* (2021.01); *H01M 50/548* (2021.01); *H01M 50/553* (2021.01); *H01M 50/562* (2021.01)

(58) Field of Classification Search
None
See application file for complete search history.

(56) References Cited

U.S. PATENT DOCUMENTS

| | | | |
|---|---|---|---|
| 2001/0038938 A1* | 11/2001 | Takahashi | H01G 2/18 429/185 |
| 2018/0102500 A1* | 4/2018 | Harai | H10K 50/8426 |
| 2019/0097208 A1* | 3/2019 | Kawase | H01M 10/052 |

FOREIGN PATENT DOCUMENTS

| | | |
|---|---|---|
| JP | 2008-140633 | 6/2008 |
| JP | 2013-257981 | 12/2013 |

OTHER PUBLICATIONS

International Search Report of PCT application No. PCT/JP2020/001200 dated Mar. 24, 2020.

* cited by examiner

Primary Examiner — Zhongqing Wei
(74) Attorney, Agent, or Firm — Rimon P.C.

(57) ABSTRACT

The present disclosure provides a battery that can further reliably suppress penetration of moisture and so forth inside the battery. A battery according to an embodiment of the present disclosure includes a power generation element; and a sealing member containing an insulating material and zeolite particles. The power generation element includes a positive electrode, a negative electrode, and a solid electrolyte layer disposed between the positive electrode and the negative electrode. The zeolite particles have an average particle size less than or equal to 1 μm.

10 Claims, 6 Drawing Sheets

(51) Int. Cl.
  *H01M 50/191* (2021.01)
  *H01M 50/176* (2021.01)
  *H01M 50/193* (2021.01)
  *H01M 50/409* (2021.01)
  *H01M 50/489* (2021.01)
  *H01M 50/548* (2021.01)
  *H01M 50/553* (2021.01)
  *H01M 50/562* (2021.01)

BATTERY INCLUDING POWER GENERATION ELEMENT AND SEALING MEMBER CONTAINING INSULTING MATERIAL AND ZEOLITE PARTICLES

BACKGROUND

1. Technical Field

The present disclosure relates to a battery.

2. Description of the Related Art

Japanese Unexamined Patent Application Publication No. 2008-140633 describes a bipolar rechargeable battery module that includes a gas adsorption layer containing zeolite.

Japanese Unexamined Patent Application Publication No. 2013-257981 describes a sulfide solid-state battery that uses zeolite powder having a particle size of 3 µm or more and 10 µm or less as a moisture absorber in a sealing member.

SUMMARY

In these conventional batteries, the gas adsorbing ability and moisture absorbing ability are not sufficient since zeolite particles have a relatively large particle size. For this reason, a technique for further reliably preventing moisture or the like from entering the inside of the battery is desired.

In one general aspect, the techniques disclosed here feature a battery including: a power generation element; and a sealing member containing an insulating material and zeolite particles, where the power generation element includes a positive electrode, a negative electrode, and a solid electrolyte layer disposed between the positive electrode and the negative electrode; and the zeolite particles have an average particle size less than or equal to 1 µm.

According to the technique of the present disclosure, it is possible to further reliably prevent moisture or the like from entering the inside of the battery. Consequently, the environmental resistance of a battery is enhanced.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
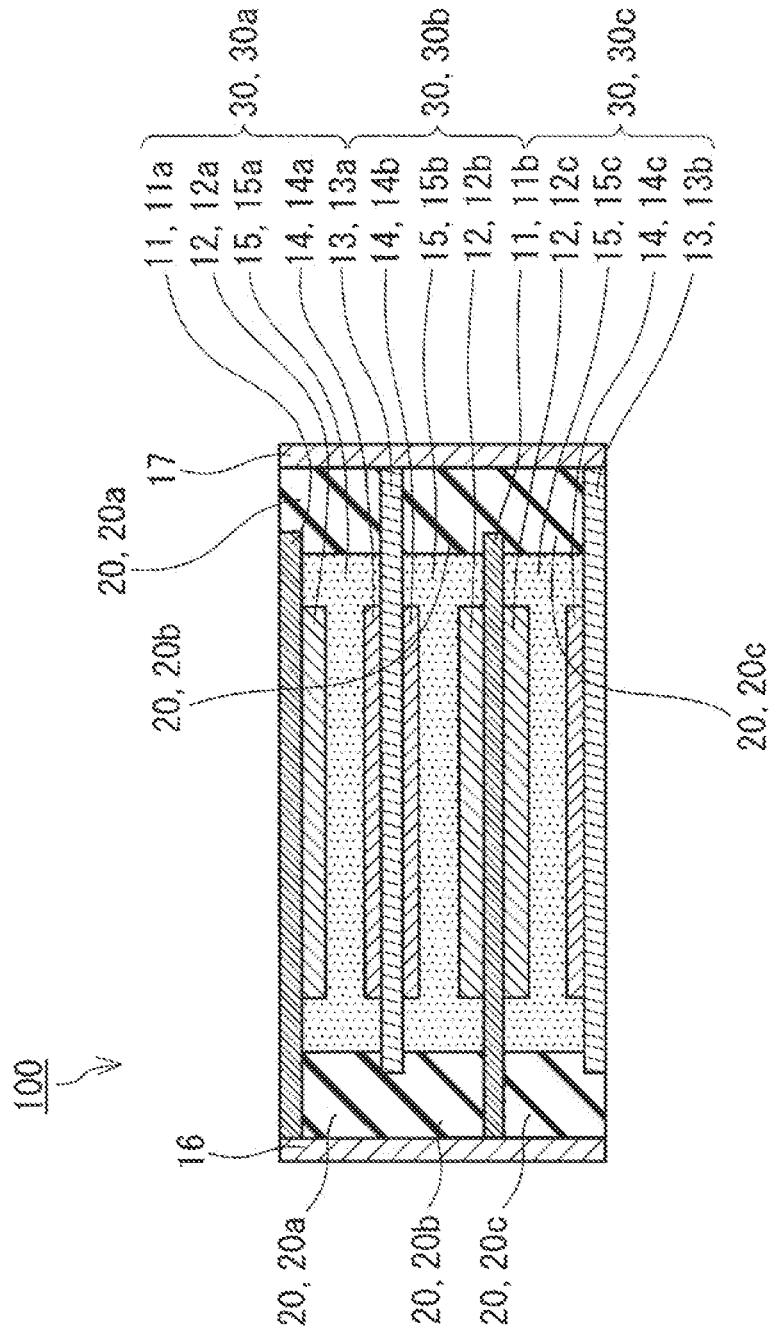
FIG. 1 is a cross-sectional view of a battery according to Embodiment 1.

Outline of Aspects According to Present Disclosure

A battery according to a first aspect of the present disclosure, includes:

a power generation element; and a sealing member containing an insulating material and zeolite particles, where the power generation dement includes:

a positive electrode;

a negative electrode; and a solid electrolyte layer disposed between the positive electrode and the negative electrode, and the zeolite particles have an average particle size less than or equal to 1 µm.

According to the first aspect, it is possible to further reliably prevent moisture or the like from entering the inside of the battery. Consequently, the environmental resistance of the battery is enhanced.

In a second aspect of the present disclosure, the solid electrolyte layer may contain a sulfide solid electrolyte, for example, in the battery of the first aspect. According to this feature, a highly reliable battery can be realized.

In a third aspect of the present disclosure, the insulating material may include a resin, for example, in the battery according to the first or the second aspect.

In a fourth aspect of the present disclosure, the resin may be at least one resin selected from the group consisting of an acrylic resin, a silicone resin, and an epoxy resin, for example, in the battery of the third aspect.

According to the third and the fourth aspects, it is possible to prevent a short circuit due to contact between current collectors as well as between a current collector and an electrode terminal.

In a fifth aspect of the present disclosure, the sealing member may seals periphery of the power generation element, for example, in the battery of any one of the first to the fourth aspects. According to this feature, the solid electrolyte layer can be isolated from the external environment.

In a sixth aspect of the present disclosure, the sealing member may include a first portion and a second portion, for example, in the battery according to any one of the first to the fifth aspects; the first portion may be in contact with the power generation element; the second portion may cover the first portion; and at least one selected from the first portion and the second portion may contain the zeolite particles. According to these features, the solid electrolyte layer can be further satisfactorily isolated from the external environment.

In a seventh aspect of the present disclosure, for example, the battery according to any one of the first to the fourth aspects may further include a case accommodating the power generation element; and the sealing member may be disposed in a sealing portion of the case.

In an eighth aspect of the present disclosure, for example, the battery according to the seventh aspect may further include an extraction electrode that is electrically connected to the power generation element and that extends outside the case through the sealing portion; and the sealing member may seal a gap between the case and the extraction electrode in the sealing portion.

According to the seventh and the eighth aspects, the battery can be thinned.

In a ninth aspect of the present disclosure, the sealing member may contain at least one selected from the group consisting of moisture and sulfides, for example, in the battery of any one of the first to the eighth aspects. According to this feature, a sulfide gas generated during use of the battery can be adsorbed further satisfactorily.

In a tenth aspect of the present disclosure, the zeolite particles may contain $SiO_2$ and $Al_2O_3$, for example, in the battery according to any one of the first to the ninth aspects; and a molar ratio of the $SiO_2$ contained in the zeolite particles to the $Al_2O_3$ contained in the zeolite particles may be greater than 1. According to these features, it is possible to reduce the amount of metal cations present inside pores of the zeolite particles and hence to increase further sufficiently the amount of a low-polarity sulfide gas to be adsorbed.

In an eleventh aspect of the present disclosure, the zeolite particles may contain Ag, for example, in the battery according to any one of the first to the tenth aspects.

In a twelfth aspect of the present disclosure, the zeolite particles may contain Zn, for example, in the battery according to any one of the first to the eleventh aspects.

According to the eleventh and twelfth aspects, a sulfide gas can be adsorbed further satisfactorily.

In a thirteenth aspect of the present disclosure, the zeolite particles may have an average particle size less than or equal to 0.1 μm, for example, in the battery according to any one of the first to the twelfth aspects.

According to the thirteenth aspect, it is possible to further reliably suppress penetration of moisture and so forth inside the battery. Consequently, the environmental resistance of the battery is enhanced.

Hereinafter, embodiments will be described concretely with reference to the drawings.

Embodiment 1

Outline of Laminated Battery

First, a battery according to the present embodiment will be described.

FIG. 1 is a cross-sectional view of a laminated battery 100 according to the present Embodiment 1. In the present embodiment, the battery 100 is a laminated battery. Accordingly, "battery 100" herein is referred to as "laminated battery 100" in some cases.

As illustrated in FIG. 1, the battery 100 includes a plurality of cells 30, a positive electrode terminal 16, and a negative electrode terminal 17. Herein, the "cell" is referred to as "solid-state battery cell" in some cases. A plurality of the cells 30 are electrically connected in parallel. Each of the cells 30 has two pairs of facing end faces. In the battery 100, a plurality of the cells 30 are laminated.

The number of the cells 30 is not particularly limited and may be greater than or equal to 20 and less than or equal to 100, greater than or equal to 2 and less than or equal to 100, or greater than or equal to 2 and less than or equal to 10. In the present embodiment, the battery 100 includes a plurality of cells 30a, 30b, and 30c. These cells 30a, 30b, and 30c are laminated in this order.

Each of the positive electrode terminal 16 and the negative electrode terminal 17 is electrically connected to a plurality of the cells 30. The shape of the positive electrode terminal 16 and the negative electrode terminal 17 is sheet-like, for example. The positive electrode terminal 16 and the negative electrode terminal 17 face each other. A plurality of the cells 30 are positioned between the positive electrode terminal 16 and the negative electrode terminal 17. The positive electrode terminal 16 and the negative electrode terminal 17 herein are simply referred to as "electrode terminal" or "terminal" in some cases.

Each of the cells 30 includes a positive electrode current collector 11, a positive electrode layer 12, a negative electrode current collector 13, a negative electrode layer 14, a solid electrolyte layer 15, and a first sealing member 20. The positive electrode current collector 11, the positive electrode layer 12, the solid electrolyte layer 15, the negative electrode layer 14, and the negative electrode current collector 13 are laminated in this order. The positive electrode current collector 11 and the negative electrode current collector 13 are simply referred to as "current collector" in some cases.

The positive electrode current collector 11 has a sheet-like shape, for example. The positive electrode current collector 11 is electrically connected to the positive electrode layer 12 and to the positive electrode terminal 16. The positive electrode current collector 11 may be in direct contact with the positive electrode layer 12 and with the positive electrode terminal 16. For example, the principal surface of the positive electrode current collector 11 may be in direct contact with the positive electrode layer 12. The term "principal surface" indicates a largest-area surface of the positive electrode current collector 11. An end (end face) of the positive electrode current collector 11 may be in direct contact with the positive electrode terminal 16. The positive electrode current collector 11 and the negative electrode terminal 17 are electrically separated from each other via a gap. The shortest distance between the positive electrode current collector 11 and the negative electrode terminal 17 is not particularly limited and may be greater than or equal to 20 μm and less than or equal to 100 μm, greater than or equal to 1 μm and less than or equal to 100 μm, or greater than or equal to 1 μm and less than or equal to 10 μm.

The positive electrode layer 12 has, for example, a rectangular shape in a planar view. The positive electrode layer 12 is disposed on the positive electrode current collector 11. The positive electrode layer 12, for example, partially covers the principal surface of the positive electrode current collector 11. The positive electrode layer 12 may cover a region that includes the center of gravity on the principal surface of the positive electrode current collector 11. Herein, "positive electrode current collector and positive electrode layer" is collectively referred to as "positive electrode" in some cases.

The negative electrode current collector 13 has a sheet-like shape, for example. The negative electrode current collector 13 is electrically connected to the negative electrode layer 14 and to the negative electrode terminal 17. The negative electrode current collector 13 may be in direct contact with the negative electrode layer 14 and with the negative electrode terminal 17. For example, the principal surface of the negative electrode current collector 13 may be in direct contact with the negative electrode layer 14. The end (end face) of the negative electrode current collector 13 may be in direct contact with the negative electrode terminal 17. The negative electrode current collector 13 and the positive electrode terminal 16 are electrically separated from each other via a gap. The shortest distance between the negative electrode current collector 13 and the positive electrode terminal 16 is not particularly limited and may be greater than or equal to 20 μm and less than or equal to 100 μm, greater than or equal to 1 μm and less than or equal to 100 μm, or greater than or equal to 1 μm and less than or equal to 10 μm.

In a planar view, for example, the gap between the negative electrode current collector 13 and the positive electrode terminal 16 does not overlap the gap between the positive electrode current collector 11 and the negative electrode terminal 17.

The negative electrode layer 14 has, for example, a rectangular shape in a planar view. The negative electrode layer 14 is disposed on the negative electrode current collector 13. The negative electrode layer 14, for example, partially covers the principal surface of the negative electrode current collector 13. The negative electrode layer 14 may cover a region that includes the center of gravity on the principal surface of the negative electrode current collector 13. Herein, "negative electrode current collector and negative electrode layer" is collectively referred to as "negative electrode" in some cases.

The solid electrolyte layer 15 is disposed between the positive electrode current collector 11 and the negative electrode current collector 13. In other words, the solid electrolyte layer 15 is disposed between the positive electrode layer 12 and the negative electrode layer 14. The solid electrolyte layer 15 may be in contact with the positive electrode layer 12 and with the negative electrode layer 14.

The first sealing member 20 seals periphery of the power generation element comprising the positive electrode, the negative electrode, and the solid electrolyte layer 15. The first sealing member 20 is positioned outside the solid electrolyte layer 15 in a planar view. The first sealing member 20 may be in contact with the positive electrode current collector 11 and with the negative electrode current collector 13. The positive electrode current collector 11 may be partially embedded in the first sealing member 20. The negative electrode current collector 13 may be partially embedded in the first sealing member 20. The first sealing member 20 may be in contact with the solid electrolyte layer 15. Specifically, the first sealing member 20 may be in contact with the entire side surface of the solid electrolyte layer 15. The first sealing member 20 may be in contact with the positive electrode terminal 16 and with the negative electrode terminal 17. In the battery 100, for example, the solid electrolyte layer 15 is in contact with neither the terminal 16 nor the terminal 17. According to this configuration, the first sealing member 20 can protect the power generation element inside the battery 100. Moreover, the solid electrolyte layer can be isolated from the external environment. Consequently, it is possible to provide a highly reliable battery 100. Herein, the "power generation element" is referred to as "cell" in some cases.

In the battery 100, the cell 30a has a first sealing member 20a, the cell 30b has a first sealing member 20b, and the cell 30c has a first sealing member 20c. The first sealing member 20a may be in contact with the first sealing member 20b in a gap between the negative electrode current collector 13a and the positive electrode terminal 16. The first sealing member 20b may be in contact with the first sealing member 20c in a gap between the positive electrode current collector 11b and the negative electrode terminal 17.

The first sealing member 20 may be positioned outside the power generation element. Herein, the "outside of the power generation element" indicates a cell 30 portion that does not affect the electric characteristics and thus indicates, for example, the outside of a portion surrounded by the positive electrode layer 12 and the negative electrode layer 14. Alternatively, to enhance impact resistance and prevent a short circuit in the cell 30, the first sealing member 20 may be positioned inside the power generation element. The "inside of the power generation element" indicates, for example, the inside of a portion surrounded by the positive electrode layer 12 and the negative electrode layer 14.

Components of Laminated battery

Hereinafter, each component of the battery 100 will be described further concretely.

First, each component of the laminated battery 100 as an embodiment of the present disclosure will be described.

The positive electrode layer 12 acts as a positive electrode active material layer containing a positive electrode active material. The positive electrode layer 12 may contain a positive electrode active material as a main component. The term "main component" herein means a component contained most in weight ratio in the positive electrode layer 12.

The "positive electrode active material" refers to a substance that undergoes oxidation or reduction through insertion or removal of metal ions, such as lithium (Li) ions or magnesium (Mg) ions, into or from its crystal structure at a potential higher than the negative electrode. The positive electrode active material may be selected appropriately depending on the types of a battery, and publicly known positive electrode active materials may be used. As the positive electrode active material, a compound containing lithium and a transition metal element may be used. Examples of such a compound include oxides containing lithium and a transition metal element; and phosphoric acid compounds containing lithium and a transition metal element. Exemplary oxides containing lithium and a transition metal element include lithium nickel complex oxide, layered oxides, and lithium manganese oxide having a spinel structure. As the lithium nickel complex oxide, for example, lithium nickel complex oxide represented by $LiNi_xM_{1-x}O_2$ may be used, where M is at least one element selected from the group consisting of Co, Al Mn, V, Cr, Mg, Ca, Ti Zr, Nb, Mo, and W; and x satisfies $0<x\le 1$. As the layered oxides, for example, lithium cobalt oxide ($LiCoO_2$), lithium nickel oxide ($LiNiO_2$), and lithium manganese oxide ($LiMn_2O_4$) may be used. As the lithium manganese oxide having a spinel structure, for example, $LiMn_2O_4$, $Li_2MnO_3$, and $LiMnO_2$ may be used. As the phosphoric acid compound containing lithium and a transition metal element, for example, lithium iron phosphate ($LiFePO_4$) having an olivine structure may be used. As the positive electrode active material, sulfur (S) and sulfides, such as lithium sulfide ($Li_2S$), may also be used. Moreover, particles obtained by applying or adding lithium niobate ($LiNbO_3$) or the like to sulfide-containing particles may also be used as the positive electrode active material. These positive electrode active materials may be used alone or in combination.

As in the foregoing, the positive electrode layer 12 is not particularly limited provided that a positive electrode active material is contained. The positive electrode layer 12 may be a mixture layer formed from a mixture of a positive electrode active material and other additive materials. As other additive materials, a solid electrolyte, a conductive additive, and a binder, for example, may be used. Exemplary solid electrolytes include inorganic solid electrolytes. Exemplary conductive additives include acetylene black. Exemplary binders include polyethylene oxide and polyvinylidene fluoride. By mixing a positive electrode active material with other additive materials in predetermined proportions, it is possible to enhance lithium ion conductivity as well as electron conductivity within the positive electrode layer 12.

The positive electrode layer 12 has a thickness of greater than or equal to 5 μm and less than or equal to 300 μm for example.

The negative electrode layer 14 acts as a negative electrode active material layer containing a negative electrode active material or other negative electrode materials. The negative electrode layer 14 may contain a negative electrode material as a main component. The "negative electrode active material" refers to a substance that undergoes oxidation or reduction through insertion or removal of metal ions, such as lithium (Li) ions or magnesium (Mg) ions, into or from its crystal structure at a potential lower than the positive electrode. The negative electrode active material may be selected appropriately depending on the types of a battery, and publicly known negative electrode active materials may be used. As the negative electrode active material, carbon materials or alloying materials to be mixed with a solid electrolyte may be used. Exemplary carbon materials include natural graphite, artificial graphite, graphite carbon fibers, and heat-treated resin carbon. Exemplary alloying materials to be mixed with a solid electrolyte include lithium alloys, oxides of lithium and a transition metal element, and metal oxides. Exemplary lithium alloys include LiAl, LiZn, $Li_3Bi$, $Li_3Cd$, $Li_3Sb$, $Li_{4.4}Pb$, $Li_{4.4}Sn$, $Li_{0.17}C$, and $LiC_6$. Exemplary oxides of lithium and a transition metal element include lithium titanate ($Li_4Ti_5O_{12}$). Exemplary metal oxides include zinc oxide (ZnO) and silicon oxide ($SiO_x$). These negative electrode active materials may be used alone or in combination.

As in the foregoing, the negative electrode layer 14 is not particularly limited provided that a negative electrode active material is contained. The negative electrode layer 14 may be a mixture layer formed from a mixture of a negative electrode active material and other additive materials. As other additive materials, a solid electrolyte, a conductive additive, and a binder, for example, may be used. Exemplary solid electrolytes include inorganic solid electrolytes. Exemplary conductive additives include acetylene black. Exemplary binders include polyethylene oxide and polyvinylidene fluoride. By mixing a negative electrode active material with other additive materials in predetermined proportions, it is possible to enhance lithium ion conductivity as well as electron conductivity within the negative electrode layer 14.

The negative electrode layer 14 has a thickness of greater than or equal to 5 μm and less than or equal to 300 μm, for example.

The solid electrolyte layer 15 contains a solid electrolyte. The solid electrolyte is not particularly limited provided that ion conductivity is exhibited, and publicly known electrolytes for batteries may be used. As the solid electrolyte, electrolytes that transport metal ions, such as Li ions and Mg ions, may be used. The solid electrolyte may be selected appropriately depending on ionic species to be transported. As the solid electrolyte, for example, inorganic solid electrolytes, such as sulfide solid electrolytes and oxide solid electrolytes, may be used. Exemplary sulfide solid electrolytes include lithium-containing sulfides, such as $Li_2S$—$P_2S_5$, $Li_2S$—$SiS_2$, $Li_2S$—$B_2S_3$, $Li_2S$—$GeS_2$, $Li_2S$—$SiS_2$—LiI, $Li_2S$—$SiS_2$—$Li_3PO_4$, $Li_2S$—$Ge_2S_2$, $Li_2S$—$GeS_2$—$P_2S_5$, and $Li_2S$—$GeS_2$—ZnS. Exemplary oxide solid electrolytes include lithium-containing metal oxides, lithium-containing metal nitrides, and lithium-containing transition metal oxides. Exemplary lithium-containing metal oxides include $Li_2O$—$SiO_2$ and $Li_2O$—$SiO_2$—$P_2O_5$. Exemplary lithium-containing metal nitrides include $Li_xP_yO_{1-z}N_z$. Exemplary lithium-containing transition metal oxides include lithium phosphate ($Li_3PO_4$) and lithium titanium oxide. As the solid electrolyte, these materials may be used alone or in combination.

The solid electrolyte layer 15 may contain, for example, a binder, such as polyethylene oxide or polyvinylidene fluoride, in addition to the above-described solid electrolyte.

The solid electrolyte layer 15 has a thickness of greater than or equal to 5 μm and less than or equal to 150 μm, for example.

The solid electrolyte may have a particle shape or may be sintered.

Next, the positive electrode terminal 16 and the negative electrode terminal 17 will be described. These terminals 16 and 17 are formed from a low-resistance conductor, for example. Alternatively, the terminals 16 and 17 are formed, for example, by curing an electrically conductive resin containing electrically conductive metal particles, such as Ag. Moreover, the terminals 16 and 17 may be formed by applying an electrically conductive adhesive to an electrically conductive metal sheet, such as a SUS sheet. By using an electrically conductive adhesive, it is possible to accommodate a plurality of cells 30 between two metal sheets. Such an electrically conductive adhesive is not particularly limited as long as the conductivity and joining properties can be maintained within the operating temperature range of the laminated battery 100 as well as in the manufacturing process for the laminated battery 100. The composition, thickness, and materials of the electrically conductive adhesive are also not particularly limited provided that the durability can be maintained without affecting the lifetime or battery characteristics of the laminated battery 100 when a current at a maximum rate required in the operating environment of the laminated battery 100 is applied thereto. The terminals 16 and 17 may be plated with Ni—Sn or the like.

The positive electrode current collector 11 and the negative electrode current collector 13 are not particularly limited provided that the current collectors are formed from electrically conductive materials. Exemplary materials of the current collectors 11 and 13 include stainless steel, nickel, aluminum, iron, titanium, coper, palladium, gold, and platinum. These materials of the current collectors 11 and 13 may be used alone or in combination as alloys. The current collectors 11 and 13 may be in the form of a foil, a sheet, a mesh, or the like. The materials of the current collectors 11 and 13 are not particularly limited unless the current collectors 11 and 13 melt or decompose in the manufacturing process for the battery 100, at an operating temperature of the battery 100, and at a pressure inside the battery 100. The materials of the current collectors 11 and 13 may be selected appropriately in view of the working potential of the battery 100 to be applied to the current collectors 11 and 13 as well as the electric conductivity of the current collectors 11 and 13. Moreover, the materials of the current collectors 11 and 13 may also be selected depending on tensile strength and heat resistance required for the current collectors 11 and 13. Exemplary materials of the current collectors 11 and 13 include copper, aluminum, and alloys containing copper and/or aluminum as a main component. The current collectors 11 and 13 may be an electrolytic copper foil having high strength or cladding of laminated dissimilar metal foils. The current collectors 11 and 13 have a thickness of greater than or equal to 10 μm and less than or equal to 100 μm, for example.

The first sealing member 20 contains an insulating material and zeolite particles. The zeolite particles are dispersed in a matrix of the insulating material. The insulating material is a resin, for example. Exemplary resin include an acrylic resin, a silicone resin, and an epoxy resin. By incorporating an insulating material into the first sealing member 20, it is possible to suppress short circuits due to the contact between the positive electrode current collector 11 and the negative electrode current collector 13, the contact between the positive electrode current collector 11 and the negative electrode terminal 17, and the contact between the negative electrode current collector 13 and the positive electrode terminal 16.

The zeolite particles have the composition represented by $M_{x/n}(Al_2O_3)_x(SiO_2)_y \cdot wH_2O$, where M represents an n-valent cation. The ratio of the molar quantity y of $SiO_2$ to the molar quantity x of $Al_2O_3$, in other words, the molar ratio (y/x) may be $1 \leq y/x \leq 5$, for example. Moreover, the molar quantity of $SiO_2$ contained in the zeolite particles may be greater than the molar quantity of $Al_2O_3$. For example, the molar ratio (y/x) may be $1 < y/x \leq 2.5$. When the molar ratio of $SiO_2$ to $Al_2O_3$ is greater than 1, it is possible to reduce the amount of metal cations present inside pores of the zeolite particles.

For this reason, it is possible to further sufficiently increase the amount of a low-polarity sulfide gas to be adsorbed. Consequently, the odor due to a sulfide gas generated during use of the battery can be reduced further.

The zeolite particles may contain Ag and/or Zn. By incorporating Ag and/or Zn into the zeolite particles, Ag and/or Zn can chemically react with a sulfide gas. Consequently, the zeolite particles can adsorb a sulfide gas further satisfactorily.

The shape and size of the zeolite particles contained in the first sealing member 20 are not particularly limited. The zeolite particles are in the form of particles, for example. The average particle size of the zeolite particles may be, for example, greater than or equal to 0.01 μm and less than or equal to 1 μm or may be greater than or equal to 0.01 μm and less than or equal to 0.1 μm. The average particle size may be a median diameter (d50) measured using a particle size distribution analyzer, for example, Since the zeolite particles contained in the first sealing member 20 are small in size, the zeolite particles can adsorb, in a larger quantity, moisture from the outside or a sulfide gas generated inside the battery. Consequently, it is possible to suppress the odor due to a sulfide gas generated during use of the battery, corrosion of an electrode layer and so forth due to a sulfide gas, or deterioration in battery performance due to penetration of moisture inside the battery. Further, since the zeolite particles contained in the first sealing member 20 are small in size, the battery can be thinned.

When the particle size distribution cannot be measured, the average particle size of zeolite particles can be calculated by the following method. A group of zeolite particles contained in a sealing member is observed under an electron microscope to calculate the area of a certain particle on the electron micrograph through image processing. When a group of particles alone cannot be observed directly, a structure containing the particles is observed under an electron microscope to calculate the area of a certain particle on the electron micrograph through image processing. The diameter of a circle having the same area as the calculated area is regarded as the diameter of the particle. The diameter is calculated for an appropriate number (10, for example) of particles, and the average is regarded as the average particle size of these particles.

The first sealing member 20 may contain moisture and/or a sulfide. By incorporating moisture and/or a sulfide in advance into the first sealing member 20, the sealing member can adsorb a sulfide gas generated during use of the battery further satisfactorily. Consequently, it is possible to reduce the odor due to a sulfide gas generated during use of the battery.

By sealing the power generation element with the first sealing member 20, it is possible to isolate from the external environment the solid electrolyte layer 15, which readily deteriorates due to water and so forth. In addition, it is also possible to suppress release of a sulfide gas generated inside the battery outside. Consequently, the environmental resistance of the laminated battery 100 having high energy density, high reliability, and high capacity can be enhanced.

The above-described components of the laminated battery 100 may be combined appropriately.

Method of Manufacturing Battery

Next, an exemplary method of manufacturing the battery 100 according to the present embodiment will be described. The battery 100 according to the present embodiment may be prepared by a sheet making method, for example.

Herein, the process of making a cell 30 is referred to as "sheet making process" in some cases. In the sheet making process, for example, a laminated structure is prepared by laminating precursors of the respective components of the cell 30 to be included in the battery 100 according to the present embodiment. In the laminated structure, for example, a precursor of the positive electrode current collector 11, a sheet of the positive electrode layer 12, a sheet of the solid electrolyte layer 15, a sheet of the negative electrode layer 14, and a precursor of the negative electrode current collector 13 are laminated in this order. According to the number of cells 30 to be connected in parallel, a predetermined number of laminated structures are prepared. The order of forming members to be included in the laminated structure is not particularly limited.

First, the sheet making process will be described. The sheet making process includes a step of making precursor sheets of the respective components of the cell 30 and laminating the sheets.

A sheet of the positive electrode layer 12 can be prepared by the following method, for example. First, a slurry for preparing a sheet of the positive electrode layer 12 is obtained by mixing a positive electrode active material with, for a mixture, a solid electrolyte, a conductive additive, a binder, and a solvent. Herein, the slurry for preparing a sheet of the positive electrode layer 12 is referred to as "positive electrode active material slurry" in some cases. Next, the positive electrode active material slurry is applied to a precursor of the positive electrode current collector 11 by a printing method or the like. The resulting coating film is dried to yield a sheet of the positive electrode layer 12.

As the precursor of the positive electrode current collector 11, for example, a copper foil having a thickness of about 30 μm may be used. As the positive electrode active material, for example, powder of lithium nickel cobalt aluminum complex oxide ($LiNi_{0.8}Co_{0.15}Al_{0.05}O_2$) having an average particle size of about 5 μm and having a layered structure may be used. As the solid electrolyte for a mixture, for example, $Li_2S$—$P_2S_5$ sulfide glass powder that has an average particle size of about 10 μm and that contains triclinic crystals as main components may be used. The solid electrolyte has a high ion conductivity, for example, of greater than or equal to $2\times10^{-3}$ S/cm and less than or equal to $3\times10^{-3}$ S/cm.

The positive electrode active material slurry may be applied, for example, by a screen printing method to either surface of the caper foil as a precursor of the positive electrode current collector 11. The resulting coating film has, for example, a predetermined shape and a thickness of about greater than or equal to 50 μm and less than or equal to 100 μm. Subsequently, the coating film is dried to yield a sheet of the positive electrode layer 12. The coating film may be dried at a temperature of higher than or equal to 80° C. and lower than or equal to 130° C. The sheet of the positive electrode layer 12 has a thickness of greater than or equal to 30 μm and less than or equal to 60 μm, for example.

A sheet of the negative electrode layer 14 may be prepared by the following method, for example. First, a slurry for preparing a sheet of the negative electrode layer 14 is obtained by mixing a negative electrode active material, a solid electrolyte, a conductive additive, a binder, and a solvent. Herein, the slurry for preparing a sheet of the negative electrode layer 14 is referred to as "negative electrode active material slurry" in some cases. Next, the negative electrode active material slurry is applied to a precursor of the negative electrode current collector 13 by a printing method or the like. The resulting coating film is dried to yield a sheet of the negative electrode layer 14.

As the precursor of the negative electrode current collector 13, for example, a copper foil having a thickness of about 30 μm may be used. As the negative electrode active material, for example, natural graphite powder having an average particle size of about 10 μm may be used. As the solid electrolyte, for example, the solid electrolyte described in the preparation method for the sheet of the positive electrode layer 12 may be used.

The negative electrode active material slurry may be applied, for example, by a screen printing method to either surface of the caper foil as a precursor of the negative electrode current collector 13. The resulting coating film has, for example, a predetermined shape and a thickness of about greater than or equal to 50 μm and less than or equal to 100 μm. Subsequently, the coating film is dried to yield a sheet of the negative electrode layer 14. The coating film may be dried at a temperature of higher than or equal to 80° C. and lower than or equal to 130° C. The sheet of the negative electrode layer 14 has a thickness of greater than or equal to 30 μm and less than or equal to 60 μm, for example.

A sheet of the solid electrolyte layer 15 is disposed between the sheet of the positive electrode layer 12 and the sheet of the negative electrode layer 14. The sheet of the solid electrolyte layer 15 may be prepared by the following method, for example. First, a slurry for preparing a sheet of the solid electrolyte layer 15 is obtained by mixing a solid electrolyte, a conductive additive, a binder, and a solvent. Herein, the slurry for preparing a sheet of the solid electrolyte layer 15 is referred to as "solid electrolyte slurry" in some cases. The solid electrolyte slurry is applied to the sheet of the positive electrode layer 12. In the same manner, the solid electrolyte slurry is applied to the sheet of the negative electrode layer 14. The solid electrolyte slurry is applied, for example, by a printing method using a metal mask. The resulting coating film has a thickness of about 100 μm, for example. Subsequently, the coating film is dried. The coating film may be dried at a temperature higher than or equal to 80° C. and lower than or equal to 130° C. Consequently, a sheet of the solid electrolyte layer 15 is formed on the sheet of the positive electrode layer 12 and on the sheet of the negative electrode layer 14.

The preparation method for a sheet of the solid electrolyte layer 15 is not limited to the above-described method. A sheet of the solid electrolyte layer 15 may be prepared by the following method. First, a solid electrolyte slurry is applied to a substrate by a printing method or the like. The substrate is not particularly limited provided that a sheet of the solid electrolyte layer 15 can be formed on the substrate, and examples include Teflon (registered trademark) and polyethylene terephthalate (PET). The substrate is in the form of a film or a foil, for example. Subsequently, a coating film formed on the substrate is dried to yield a sheet of the solid electrolyte layer 15. The sheet of the solid electrolyte layer 15 may be used after releasing from the substrate.

Solvents used for the positive electrode active material slurry, the negative electrode active material slurry, and the solid electrolyte slurry are not particularly limited provided that the solvents can dissolve a binder and do not adversely affect battery characteristics. Exemplary solvents include alcohols, such as ethanol, isopropanol, n-butanol, and benzyl alcohol; organic solvents, such as toluene, ethyl acetate, butyl acetate, acetone, methyl ethyl ketone, methyl isobutyl ketone, ethylene glycol ethyl ether, isophorone, butyl lactate, dioctyl phthalate, dioctyl adipate, N,N-dimethylformamide (DMF), and N-methyl-2-pyrrolidone (NMP); and water. These solvents may be used alone or in combination.

In the present embodiment, a screen printing method is described as a method of applying the positive electrode active material slurry, the negative electrode active material slurry, and the solid electrolyte slurry. However, the application method is not limited thereto. As the application method, a doctor blade method, a calendaring method, a spin coating method, a dip coating method, an inkjet method, an offset method, a die coating method, a spraying method, and so forth may be employed.

The positive electrode active material slurry, the negative electrode active material slurry, and the solid electrolyte slurry may be mixed with a plasticizer and other auxiliary agents as necessary in addition to the above-described positive electrode active material, negative electrode active material, solid electrolyte, conductive additive, binder, and solvent. The mixing method for the slurries is not particularly limited. The slurries may be added, as necessary, with additives, such as a thickener, a plasticizer, a defoamer, a leveling agent, and a tackifier.

Next, the first sealing member 20 is prepared. A sheet of the first sealing member 20 is prepared by applying, using a dispenser, a predetermined amount of a sealant to the ends of the positive electrode current collector 11 and of the negative electrode current collector 13.

Subsequently, the sheet of the solid electrolyte layer 15 formed on the sheet of the positive electrode layer 12 is placed over the sheet of the solid electrolyte layer 15 formed on the sheet of the negative electrode layer 14. Through this step, a laminated structure consisting of, in this order, the precursor of the positive electrode current collector 11, the positive electrode layer 12, the solid electrolyte layer 15, the negative electrode layer 14, and the precursor of the negative electrode current collector 13 is obtained.

Afterwards, to obtain the positive electrode current collector 11, the precursor of the positive electrode current collector 11 is cut. Specifically, the precursor of the positive electrode current collector 11 is cut such that the positive electrode current collector 11 and the negative electrode terminal 17 are electrically separated from each other via a gap when the negative electrode terminal 17 is disposed. The precursor of the positive electrode current collector 11 may be cut by laser, for example. By cutting the precursor of the positive electrode current collector 11, the positive electrode current collector 11 can be formed. The shortest distance between the positive electrode current collector 11 and the negative electrode terminal 17 is 10 μm, for example. The positive electrode current collector 11 and the negative electrode terminal 17 are electrically separated from each other via a gap therebetween. In other words, the positive electrode current collector 11 and the negative electrode terminal 17 are electrically insulated by the gap therebetween.

Subsequently, to obtain the negative electrode current collector 13, the precursor of the negative electrode current collector 13 is cut. Specifically, the precursor of the negative electrode current collector 13 is cut such that the negative electrode current collector 13 and the positive electrode terminal 16 are electrically separated from each other via a gap when the positive electrode terminal 16 is disposed. The precursor of the negative electrode current collector 13 may be cut by laser, for example. By cutting the precursor of the negative electrode current collector 13, the negative electrode current collector 13 can be formed. The shortest distance between the negative electrode current collector 13 and the positive electrode terminal 16 is 10 μm, for example. The negative electrode current collector 13 and the positive electrode terminal 16 are electrically separated from each other via a gap therebetween. In other words, the negative electrode current collector 13 and the positive electrode terminal 16 are electrically insulated by the gap therebetween.

The order of cutting the precursor of the positive electrode current collector 11 and cutting the precursor of the negative electrode current collector 13 is not particularly limited. The precursor of the negative electrode current collector 13 may be cut after cutting the precursor of the positive electrode current collector 11; or the precursor of the positive electrode current collector 11 may be cut after cutting the precursor of the negative electrode current collector 13. Cutting of the precursor of the positive electrode current collector 11 and cutting of the precursor of the negative electrode current collector 13 may be performed before the sheet of the solid electrolyte layer 15 formed on the sheet of the positive electrode layer 12 is placed over the sheet of the solid electrolyte layer 15 formed on the sheet of the negative electrode layer 14. Cutting of the precursor of the positive electrode current collector 11 and cutting of the precursor of the negative electrode current collector 13 may be performed by dicing or other means. An insulating portion may be provided by cutting the precursor of the positive electrode current collector 11 while partially removing the precursor. An insulating portion may also be provided by cutting the precursor of the negative electrode current collector 13 while partially removing the precursor.

As in the foregoing, a cell 30 is obtained by cutting the precursor of the positive electrode current collector 11 and further cutting the precursor of the negative electrode current collector 13.

Next, a predetermined number of cells 30 are prepared. An electrically conductive adhesive, for example, is applied to the principal surface of a positive electrode current collector 11 exposed outside each cell 30 and the principal surface of a negative electrode current collector 13 exposed outside the cell 30. Exemplary application methods of an electrically conductive adhesive include a screen printing method. Herein, the principal surface, coated with an adhesive material, of a positive electrode current collector 11 and of a negative electrode current collector 13 is referred to as "adhesive surface" in some cases. Later, the adhesive surface of a positive electrode current collector 11 of a cell 30 is bonded with the adhesive surface of a positive electrode current collector 11 of another cell 30, or the adhesive surface of a negative electrode current collector 13 of a cell 30 is bonded with the adhesive surface of a negative electrode current collector 13 of another cell 30. Through this step, a plurality of cells 30 can be laminated. Adhesive surfaces may be bonded with each other, for example, by press bonding. The temperature for bonding adhesive surfaces is, for example, higher than or equal to 50° C. and lower than or equal to 100° C. The pressure applied to cells 30 for bonding adhesive surfaces is, for example, greater than or equal to 300 MPa and less than or equal to 400 MPa. The duration for applying pressure to cells 30 is, for example, more than or equal to 90 seconds and less than or equal to 120 seconds. In place of the electrically conductive adhesive, a low-resistance electrically conductive tape may also be used for bonding. Moreover, in place of the electrically conductive adhesive, a silver powder or copper powder paste may also be used. When an adhesive surface, coated with a silver powder or copper powder paste, of a cell 30 is press-bonded with an adhesive surface of another cell 30, current collectors can be mechanically joined by anchor effect through metal particles. A method of laminating a plurality of cells 30 is not particularly limited provided that bonding properties and electric conductivity are attained.

Next, each of the cells 30 is electrically connected with a positive electrode terminal 16 and a negative electrode terminal 17. Each cell 30 may be electrically connected with terminals 16 and 17, for example, by the following method. First, an electrically conductive resin paste is applied to the surfaces, on which terminals 16 and 17 are to be disposed, of a laminated structure consisting of a plurality of cells 30. By curing the electrically conductive resin paste, terminals 16 and 17 are formed. Through these steps, a battery 100 according to the present embodiment is obtained. The temperature for curing the electrically conductive resin paste is, for example, about higher than or equal to 100° C. and lower than or equal to 300° C. The duration for curing the electrically conductive resin paste is 60 minutes, for example. The conditions for curing the electrically conductive resin paste may be, for example, 80° C. for 60 minutes. The electrically conductive resin paste may be cured under reduced pressure.

As the electrically conductive resin paste, for example, a thermosetting electrically conductive paste that contains high-melting highly electrically conductive metal particles including Ag, Cu, Ni, Zn, Al, Pd, Au, Pt, or an alloy thereof; low-melting metal particles; and a resin may be used. The highly electrically conductive metal particles have a melting point of higher than or equal to 400° C., for example. The melting point of the low-melting metal particles may be lower than or equal to the curing temperature of the electrically conductive resin paste or may be lower than or equal to 300° C. Exemplary materials of the low-melting metal particles include Sn, SnZn, SnAg, SnCu, SnAl, SnPb, In, InAg, InZn, InSn, Bi, BiAg, BiNi, BiSn, BiZn, and BiPb. By using an electrically conductive paste containing such low-melting metal powder, solid-phase and liquid-phase reactions proceed at the contact site between the electrically conductive paste and a current collector at a thermosetting temperature lower than the melting point of the low-melting metal particles. Consequently, for example, an alloy of a metal contained in the electrically conductive paste and a metal contained in the current collector is formed. A diffusion layer containing such an alloy is formed near the connection part between the current collector and a terminal. When Ag or an Ag alloy is used as electrically conductive particles and Cu is used as a current collector, a highly electrically conductive alloy containing AgCu is formed. Further, depending on combinations of a material of electrically conductive particles and a material of a current collector, AgNi, AgPd, and so forth can be formed. Consequently, a terminal and a current collector are integrally joined by a diffusion layer containing an alloy. According to such a configuration, the terminal and the current collector are connected more strongly than anchor effect. For this reason, the battery 100 is less likely to have a problem in which a member is disconnected due to impact or due to differences, between members, in thermal expansion through thermal cycles and so forth.

The shape of the highly electrically conductive metal particles and of the low-melting metal particles is not particularly limited and may be spherical, flake-like, needle-like, and so forth. As the particle size of these metal particles is smaller, alloying reactions and diffusion of an alloy proceed at a lower temperature. For this reason, the particle size and the shape of these metal particles may be adjusted appropriately in view of process design as well as effects of thermal history on battery characteristics.

A resin used for the thermosetting electrically conductive paste is not particularly limited provided that the resin acts as a binder and is selected appropriately depending on a manufacturing process to be employed, for example, suitability for a printing method or coating properties. Exemplary resin used for the thermosetting electrically conductive paste include a thermosetting resin. Exemplary thermosetting resin include an amino resin, an epoxy resin, a phenolic resin, and a silicone-modified organic resin. Exemplary amino resin include an urea resin, a melamine resin, and a guanamine resin. Exemplary epoxy resin includes bisphenol A-based an epoxy resin, a bisphenol F-based epoxy resin, a phenol novolac epoxy resin, and an alicyclic epoxy resin. Exemplary phenolic resin includes an oxetane resin, a resole, and a novolac. Exemplary silicone-modified organic resin includes a silicone-epoxy resin and a silicone-polyester. These resin may be used alone or in combination.

In the manufacturing method of the present embodiment, an example of making the battery 100 through a compacting process is described. However, terminals 16 and 17 may also be made by preparing a sintered laminated structure through a heat treatment process, applying an electrically conductive resin paste to the laminated structure, and baking.

In the battery 100, a plurality of cells 30 are connected in parallel by sharing the negative electrode current collector 13. The positive electrode current collectors 11 are positioned on the top and bottom surfaces of the cells. Alternatively, a plurality of cells 30 may be connected in parallel by sharing the positive electrode current collector 11 in the battery. In this case, the negative electrode current collectors 13 are positioned on the top and bottom surfaces of the cells. Moreover, a most part of the positive electrode current collector 11 may be embedded in the solid electrolyte layer 15, and the positive electrode current collector 11 may have an exposed portion for the contact with the positive electrode terminal 16. Further, it is also possible to obtain a solid-state battery by electrically connecting a plurality of cells in series.

Embodiment 2

Figure 2:
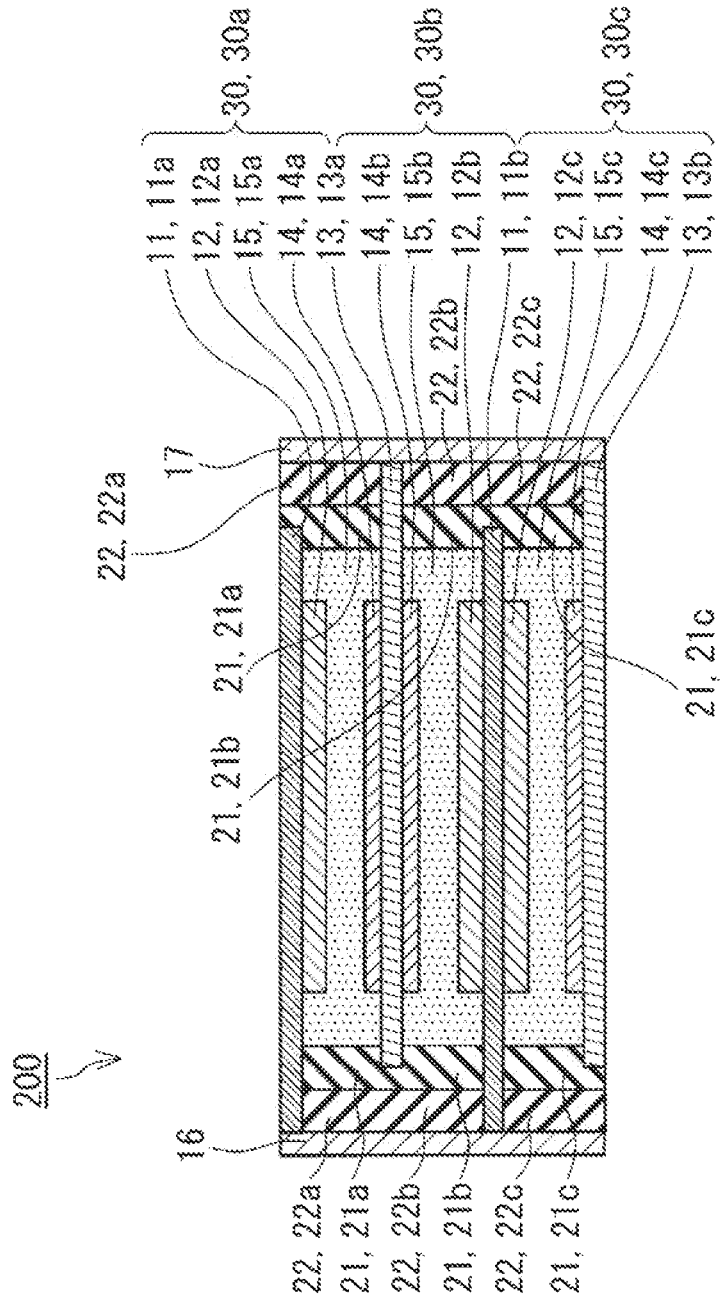
FIG. 2 is a cross-sectional view of a battery according to Embodiment 2.
Figure 3:
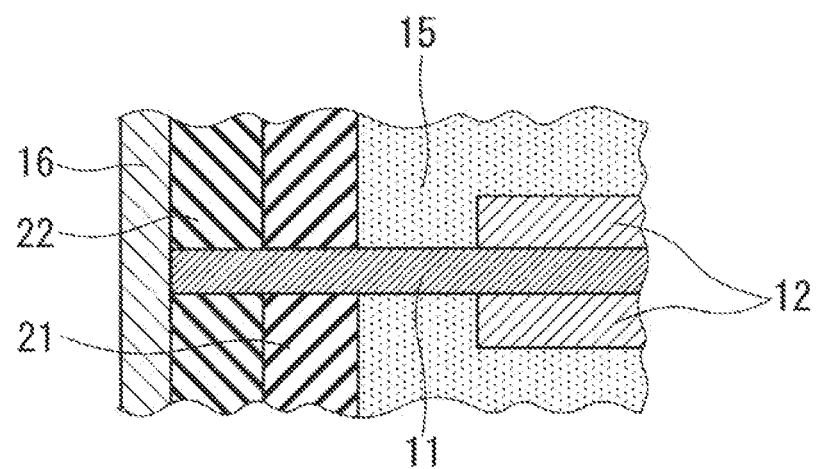
FIG. 3 is a partial enlarged view of FIG. 2.

FIG. 2 is a cross-sectional view of a battery 200 according to the present Embodiment 2. FIG. 3 is a partial enlarged view of FIG. 2. Components common between the battery 100 of Embodiment 1 and the battery 200 of the present embodiment are denoted by the same reference signs, and the explanations thereof will be omitted in some cases.

As illustrated in FIGS. 2 and 3, the first sealing member 20 includes a first portion 21 and a second portion 22 in the battery 200. In other words, the sealing member seals periphery of the power generation element includes a first portion 21 and a second portion 22. The first portion 21 is disposed between the positive electrode current collector 11 and the negative electrode current collector 13. The first portion 21 surrounds the solid electrolyte layer 15. This means that the first portion 21 seals periphery of the power generation element comprising the positive electrode, the negative electrode, and the solid electrolyte layer 15. The first portion 21 is positioned outside the solid electrolyte layer 15 in a planar view. The first portion 21 may be in contact with the positive electrode current collector 11 and with the negative electrode current collector 13. The positive electrode current collector 11 may be partially embedded in the first portion 21. The negative electrode current collector 13 may be partially embedded in the first portion 21. The first portion 21 may be in contact with the solid electrolyte layer 15. Specifically, the first portion 21 may be in contact with the entire side surface of the solid electrolyte layer 15. The first portion 21 is in contact, for example, with neither the positive electrode terminal 16 nor the negative electrode terminal 17.

The second portion 22 is disposed between the positive electrode current collector 11 and the negative electrode current collector 13. The second portion 22 covers the first portion 21. In other words, the first portion 21 is in contact with the power generation element of the battery 200, and the second portion 22 covers the first portion 21. For example, the second portion 22 is in contact with the first portion 21. The second portion 22 is positioned outside the first portion 21 in a planar view. The second portion 22 may be in contact with the positive electrode current collector 11 and with the negative electrode current collector 13. The positive electrode current collector 11 may be partially embedded in the second portion 22. The negative electrode current collector 13 may be partially embedded in the second portion 22. The second portion 22 is not in contact, for example, with the solid electrolyte layer 15. The second portion 22 may be in contact with the positive electrode terminal 16 and with the negative electrode terminal 17. According to the configuration like this, the first portion 21 and the second portion 22 can further satisfactorily protect the power generation element inside the battery 200. Consequently, it is possible to provide a highly reliable battery 200.

The composition of an insulating material and zeolite particles contained in each of the first portion 21 and the second portion 22 may be the same or different. For example, at least either of the first portion 21 and the second portion 22 may contain zeolite particles. By sealing the power generation element with a plurality of sealing members, a sulfide gas generated inside the battery or moisture from the outside can be adsorbed further satisfactorily. Consequently, it is possible to further satisfactorily suppress the odor due to a sulfide gas generated during use of the battery, corrosion of electrode layers and so forth due to the sulfide gas, or deterioration in battery performance due to penetration of moisture inside the battery. Further, it is possible to enhance the environmental resistance of the laminated battery 200 having high energy density, high reliability, and high capacity.

Embodiment 3

Figure 4:
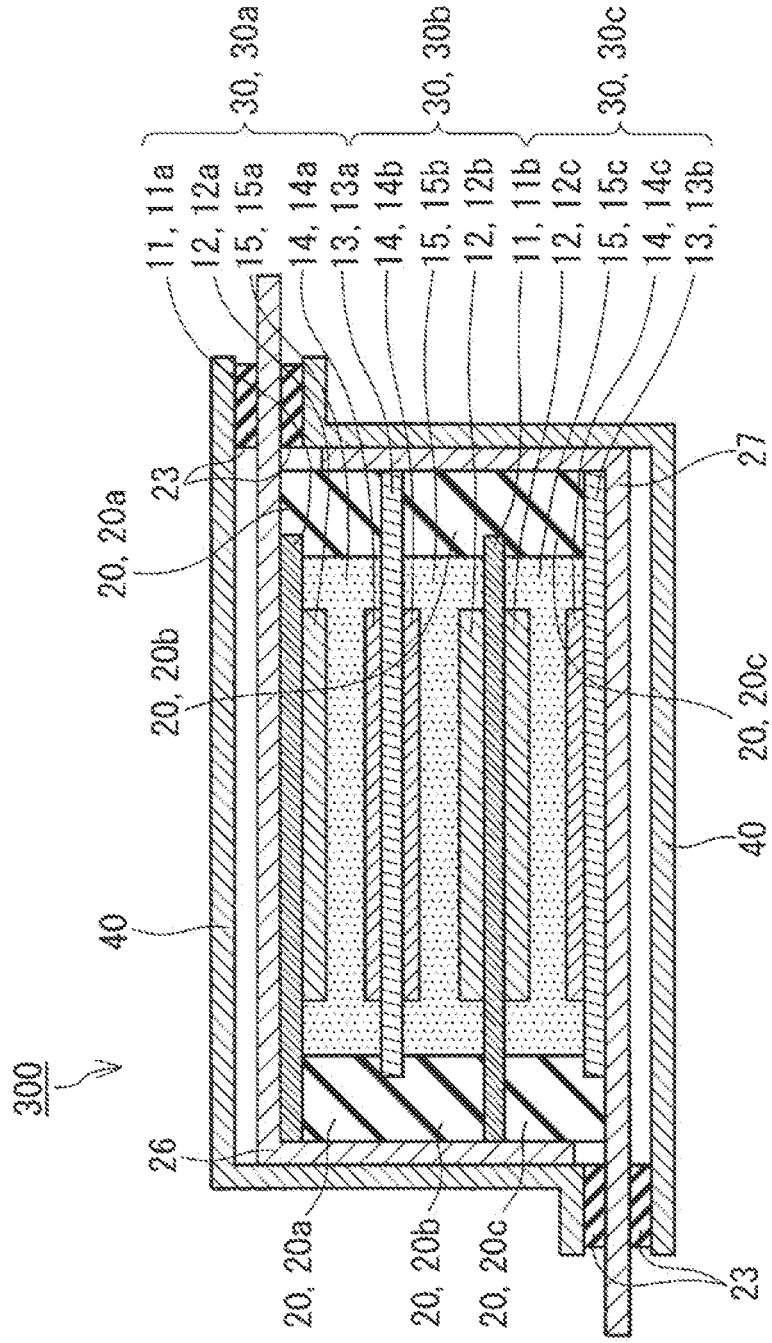
FIG. 4 is a cross-sectional view of a battery according to Embodiment 3.
Figure 5:
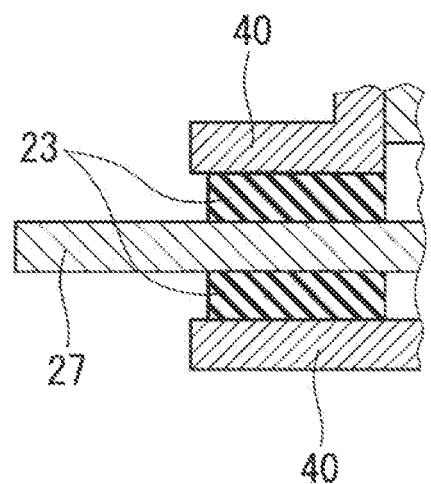
FIG. 5 is a partial enlarged view of FIG. 4.

FIG. 4 is a cross-sectional view of a battery 300 according to the present Embodiment 3. FIG. 5 is a partial enlarged view of FIG. 4. Components common between the battery 100 of Embodiment 1 and the battery 300 of the present embodiment are denoted by the same reference signs, and the explanations thereof will be omitted in some cases.

As illustrated in FIGS. 4 and 5, the battery 300 is configured by further including a case 40 accommodating the power generation element comprising the positive electrode, the negative electrode, and the solid electrolyte layer 15. In other words, the battery 300 is configured by covering, with the case 40, a laminated battery consisting of a plurality of laminated cells 30. Exemplary material of the case 40 used for the battery 300 include aluminum foil, metal, and a resin laminated with a resin film. Exemplary metals include stainless steel, iron, and aluminum. The case 40 of the battery 300 may be an aluminum laminated film, for example. The laminated battery consisting of a plurality of laminated cells 30 is sealed with such an aluminum laminated film. A resin included in the aluminum laminated film, for example, does not contain zeolite particles.

The case 40 further includes a sealing portion. A second sealing member 23 may be further disposed in the sealing portion of the case 40. For example, the second sealing member 23 contains an insulating material and zeolite particles. The material of the second sealing member 23 may be the same as or different from that of the first sealing member 20. By using the second sealing member 23 in the sealing portion of the case 40, it is possible to suppress the odor due to a sulfide gas generated during use of the battery and to suppress corrosion of electrode layers and so forth due to the sulfide gas. Moreover, it is also possible to suppress deterioration in battery performance due to penetration of moisture inside the battery. Further, the battery can be thinned.

The power generation element disposed inside the battery 300 is sealed with the first sealing member 20, and the battery 300 is sealed with the second sealing member 23 in the sealing portion of the case 40. Consequently, the power generation element can be protected further satisfactorily. For this reason, it is possible to provide a highly reliable battery 300. Here, when the sealing portion of the case 40 is sealed with the second sealing member 23, the power generation element need not be sealed with the first sealing member 20.

The battery 300 further includes extraction electrodes 26 and 27. The extraction electrodes 26 and 27 are electrically connected with the power generation element of the laminated battery. Specifically, the positive electrode-side extraction electrode 26 is electrically connected with the positive electrode current collector 11. The positive electrode-side extraction electrode 26 may be in direct contact with the end face of the positive electrode current collector 11. The positive electrode-side extraction electrode 26 may be in direct contact with the principal surface of the positive electrode current collector 11*a*. The negative electrode-side extraction electrode 27 is electrically connected with the negative electrode current collector 13. The negative electrode-side extraction electrode 27 may be in direct contact with the negative electrode current collector 13. The negative electrode-side extraction electrode 27 may be in direct contact with the principal surface of the negative electrode current collector 13*b*. The extraction electrodes 26 and 27 may be in contact with the first sealing member 20. The extraction electrodes 26 and 27 may be in contact with the case 40. The positive electrode-side extraction electrode 26 and the negative electrode-side extraction electrode 27 are not in contact with each other.

The extraction electrodes 26 and 27 extend outside the case 40 through the sealing portions of the case 40. The second sealing members 23 seal the gaps between the case 40 and either of the extraction electrodes 26 and 27 in the sealing portions. When the second sealing members 23 seals the extraction electrodes 26 and 27 in the sealing portions of the case 40, it is possible to suppress the odor due to a sulfide gas generated during use of the battery and to suppress corrosion of electrode layers and so forth due to the sulfide gas. Moreover, it is also possible to suppress deterioration in battery performance due to penetration of moisture inside the battery. Further, the battery can be thinned.

Embodiment 4

Figure 6:
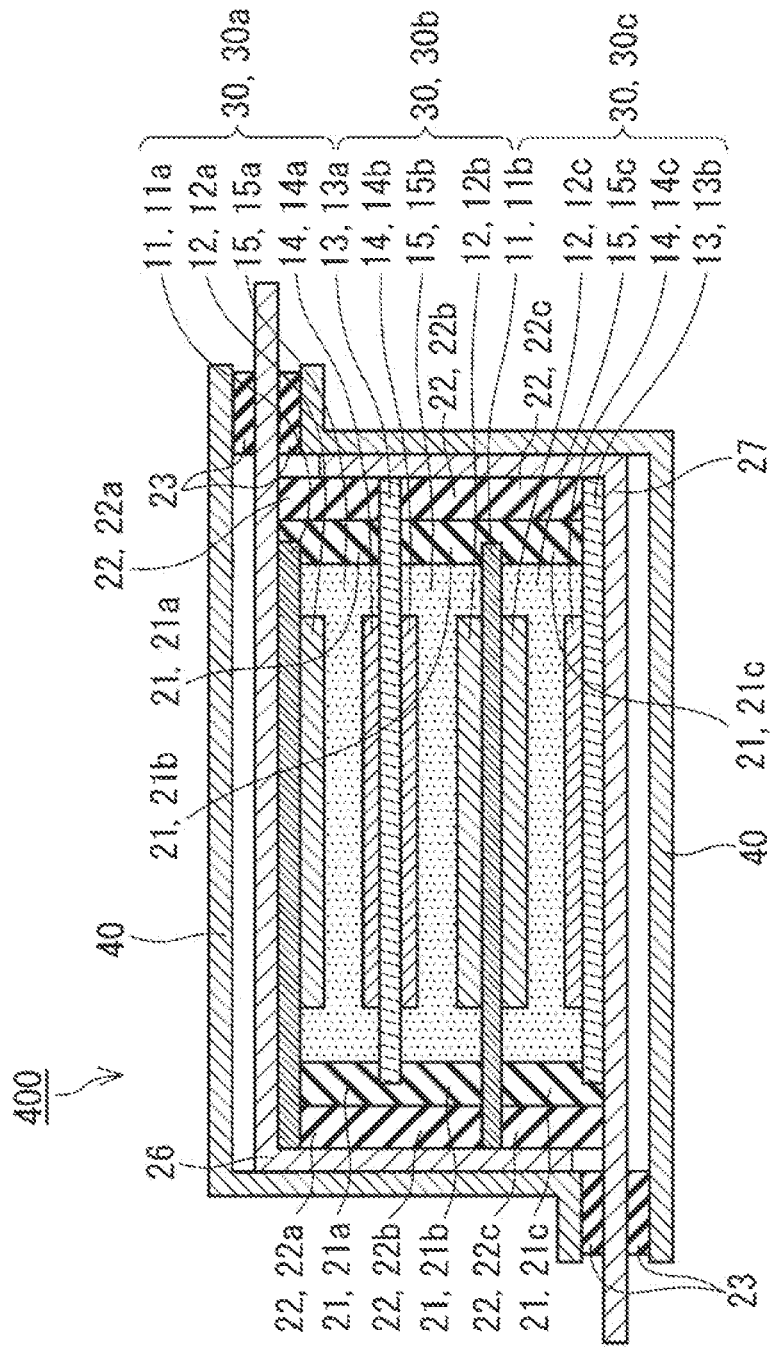
FIG. 6 is a cross-sectional view of a battery according to Embodiment 4.

FIG. 6 is a cross-sectional view of a battery 400 according to the present Embodiment 4. Components common between the battery 300 of Embodiment 3 and the battery 400 of the present embodiment are denoted by the same reference signs, and the explanations thereof will be omitted in some cases.

In the power generation element disposed inside the battery 400 as illustrated in FIG. 6, the first sealing member 20 includes a first portion 21 and a second portion 22. In other words, the sealing member seals periphery of the power generation element includes a first portion 21 and a second portion 22. The extraction electrodes 26 and 27 may be in contact with the second portion 22. The power generation element is sealed with the first portion 21 and the second portion 22, and the battery 400 is sealed with the second sealing members 23 in the sealing portions of the case 40. Consequently, the power generation element can be protected further satisfactorily. For this reason, it is possible to provide a highly reliable battery 400. Moreover, it is possible to suppress the odor due to a sulfide gas generated during use of the battery and to suppress corrosion of the electrode layers and so forth due to the sulfide gas. Further, it is also possible to suppress deterioration in battery performance due to penetration of moisture inside the battery. Furthermore, the battery can be thinned. Here, when the sealing portions of the case 40 is sealed with the second sealing members 23, the power generation element need not be sealed with the first portion 21 or the second portion 22.

EXAMPLES

Hereinafter, the present disclosure will be described in further detail by means of Examples. However, the following Examples are mere examples, and the present disclosure is by no means limited to the following Examples.

Example 1

A mixture was obtained by adding 5 wt % of zeolite particles (from Panasonic Corporation, average particle size (d50): 100 nm, $SiO_2/Al_2O_3=1.0$) to a silicone resin (X-40-2756 from Shin-Etsu Chemical Co., Ltd.), followed by mixing. The mixture was applied dropwise to an aluminum sheet and then spread with a bar coater to yield an aluminum laminated film. The thickness of the sealing portion was 15 μm. One more aluminum laminated film was similarly prepared. Subsequently, a laminated battery prepared by the method described in the "Method of Manufacturing Battery" section above was placed on either the aluminum laminated films, and the other aluminum laminated film was placed on the laminated battery. The aluminum laminated films were stuck together at 5 $kg/cm^2$ and heat-treated at 120° C. for 2 hours to yield a solid-state battery according to Example 1.

Example 2

A mixture was obtained by adding 15 wt % of zeolite particles (from Panasonic Corporation, average particle size (d50): 100 nm, $SiO_2/Al_2O_3=1.0$) to an Epiclon (registered tradename) epoxy resin (EXA-4816 from DIC Corporation), followed by mixing. The mixture was applied dropwise to an aluminum sheet and then spread with a bar coater to yield an aluminum laminated film. The thickness of the sealing portion was 2 μm. One more aluminum laminated film was similarly prepared. Subsequently, a laminated battery prepared by the method described in the "Method of Manufacturing Battery" section above was placed on either the aluminum laminated films, and the other aluminum laminated film was placed on the laminated battery. The aluminum laminated films were stuck together at 5 $kg/cm^2$ and heat-treated at 100° C. for 1 hour to yield a solid-state battery according to Example 2.

Example 3

A mixture was obtained by adding 10 wt % of zeolite particles (from Panasonic Corporation, average particle size (d50): 50 nm, $SiO_2/Al_2O_3=1.0$) to a silicone resin (X-40-2756 from Shin-Etsu Chemical Co., Ltd.), followed by mixing. The mixture was applied dropwise to an aluminum sheet and then spread with a bar coater to yield an aluminum laminated film. The thickness of the sealing portion was 5 μm. One more aluminum laminated film was similarly prepared. Subsequently, a laminated battery prepared by the method described in the "Method of Manufacturing Battery" section above was placed on either the aluminum laminated films, and the other aluminum laminated film was placed on the laminated battery. The aluminum laminated films were stuck together at 5 kg/cm$^2$ and heat-treated at 120° C. for 2 hours to yield a solid-state battery according to Example 3.

Example 4

A mixture was obtained by adding 5 wt % of zeolite particles (from Panasonic Corporation, average particle size (d50): 100 nm, $SiO_2/Al_2O_3=2.5$) to a silicone resin (X-40-2756 from Shin-Etsu Chemical Co., Ltd.), followed by mixing. The mixture was applied dropwise to an aluminum sheet and then spread with a bar coater to yield an aluminum laminated film. The thickness of the sealing portion was 5 μm. One more aluminum laminated film was similarly prepared. Subsequently, a laminated battery prepared by the method described in the "Method of Manufacturing Battery" section above was placed on either the aluminum laminated films, and the other aluminum laminated film was placed on the laminated battery. The aluminum laminated films were stuck together at 5 kg/cm$^2$ and heat-treated at 120° C. for 2 hours to yield a solid-state battery according to Example 4.

Example 5

A mixture was obtained by adding 10 wt % of zeolite particles (from Panasonic Corporation, average particle size (d50): 50 nm, $SiO_2/Al_2O_3=1.0$) to a silicone resin (KE-109E-A/B from Shin-Etsu Chemical Co., Ltd.), followed by mixing. The mixture was applied dropwise to an aluminum sheet and then spread with a bar coater to yield an aluminum laminated film. The thickness of the sealing portion was 5 μm. One more aluminum laminated film was similarly prepared. Subsequently, a laminated battery prepared by the method described in the "Method of Manufacturing Battery" section above was placed on either the aluminum laminated films, and the other aluminum laminated film was placed on the laminated battery. The aluminum laminated films were stuck together at 5 kg/cm$^2$ and heat-treated at 100° C. for 1 hour to yield a solid-state battery according to Example 5.

Comparative Example 1

A mixture was obtained by adding 5 wt % of zeolite particles (from Tosoh Corporation, average particle size (d50): 4 μm, $SiO_2/Al_2O_3=1.0$) to an Epiclon (registered tradename) epoxy resin (EXA-4816 from DIC Corporation), followed by mixing. The mixture was applied dropwise to an aluminum sheet and then spread with a bar coater to yield an aluminum laminated film. The thickness of the sealing portion was 50 μm. One more aluminum laminated film was similarly prepared. Subsequently, a laminated battery prepared by the method described in the "Method of Manufacturing Battery" section above was placed on either the aluminum laminated films, and the other aluminum laminated film was placed on the laminated battery. The aluminum laminated films were stuck together at 5 kg/cm$^2$ and heat-treated at 100° C. for 1 hour to yield a solid-state battery according to Comparative Example 1.

Comparative Example 2

A mixture was obtained by adding 5 wt % of zeolite particles (from Panasonic Corporation, average particle size (d50): 4 μm, $SiO_2/Al_2O_3=0.8$) to a silicone resin (X-40-2756 from Shin-Etsu Chemical Co., Ltd.), followed by mixing. The mixture was applied dropwise to an aluminum sheet and then spread with a bar coater to yield an aluminum laminated film. The thickness of the sealing portion was 100 μm. One more aluminum laminated film was similarly prepared. Subsequently, a laminated battery prepared by the method described in the "Method of Manufacturing Battery" section above was placed on either the aluminum laminated film, and the other aluminum laminated film was placed on the laminated battery. The aluminum laminated films were stuck together at 5 kg/cm$^2$ and heat-treated at 120° C. for 2 hours to yield a solid-state battery according to Comparative Example 2.

A charge-discharge test was performed for the prepared solid-state batteries. The charge-discharge test was performed by changing the current value in charging and in discharging. A voltage value when a current value in discharging reaches a predetermined value was regarded as an output voltage. This series of charging and discharging was set as one cycle, and 100 cycles of the charge-discharge test was performed. The output voltage and the battery capacity in the first cycle as well as the output voltage and the battery capacity in the hundredth cycle were measured. The difference between the output voltage in the first cycle and the output voltage in the hundredth cycle was regarded as "change in output voltage." The ratio of the difference between the battery capacity in the first cycle and the battery capacity in the hundredth cycle to the battery capacity in the first cycle was regarded as "change in battery capacity." The charge-discharge test was performed under conditions of a temperature of 25° C. and a humidity of 40%. The output voltage and the battery capacity were measured using a charge-discharge power supply (ECD from Matsusada Precision Inc.). Moreover, the odor of each solid-state battery was evaluated after the charge-discharge test. The sensory evaluation of the odor was performed by directly smelling each solid-state battery after the charge-discharge test. The results are shown in Table 1.

TABLE 1

| | Average particle size of zeolite particles | Odor | Change in output voltage (V) | Change in battery capacity (%) |
|---|---|---|---|---|
| Ex. 1 | 100 nm | absent | −0.01 | −5 |
| Ex. 2 | 100 nm | absent | −0.01 | −5 |
| Ex. 3 | 50 nm | absent | −0.01 | −2 |
| Ex. 4 | 100 nm | absent | −0.01 | −5 |
| Ex. 5 | 50 nm | absent | −0.01 | −3 |
| Comp. Ex. 1 | 4 μm | present | −0.2 | −40 |
| Comp. Ex. 2 | 4 μm | present | −0.2 | −38 |

As shown in Table 1, the batteries of Examples 1 to 5 had no odor even after the charge-discharge test. Moreover, the batteries of Examples 1 to 5 had change in output voltage of −0.01 V and change in battery capacity of −2% to −5%.

In contrast, as shown in Table 1, an odor was sensed for the solid-state batteries of Comparative Examples 1 and 2 after the charge-discharge test. This is presumably because a sulfide gas generated inside the batteries was released outside the batteries. The battery of Comparative Example 1 had change in output voltage of −0.2 V and change in battery capacity of −40%. The battery of Comparative Example 2 had change in output voltage of −0.2 V and change in battery capacity of −38%. This is presumably because the conductivity of the electrolyte decreased while increasing the resistance due to penetration of moisture inside the battery. The foregoing results revealed that the environmental resistance of a battery is enhanced when zeolite particles have an average particle size of less than or equal to 0.1 μm.

The battery of the present disclosure is applicable, for example, to a battery using a solid electrolyte.

What is claimed is:

1. A battery comprising:
   a power generation element; and
   a sealing member containing an insulating material and zeolite particles, wherein:
   the power generation element includes:
     a positive electrode;
     a negative electrode; and
     a solid electrolyte layer disposed between the positive electrode and the negative electrode,
   the sealing member seals periphery of the power generation element,
   the zeolite particles have an average particle size in a range from 0.01 μm to 0.1 μm,
   the zeolite particles contain $SiO_2$ and $Al_2O_3$, and
   a molar ratio of the $SiO_2$ contained in the zeolite particles to the $Al_2O_3$ contained in the zeolite particles is greater than 1.

2. The battery according to claim 1, wherein the solid electrolyte layer contains a sulfide solid electrolyte.

3. The battery according to claim 1, wherein the insulating material includes a resin.

4. The battery according to claim 3, wherein the resin is at least one resin selected from the group consisting of an acrylic resin, a silicone resin, and an epoxy resin.

5. The battery according to claim 1, wherein:
   the sealing member includes a first portion and a second portion,
   the first portion is in contact with the power generation element; the second portion covers the first portion, and
   at least one selected from the first portion and the second portion contains the zeolite particles.

6. The battery according to claim 1, wherein the sealing member contains moisture.

7. The battery according to claim 1, wherein the zeolite particles contain Ag ion.

8. The battery according to claim 1, wherein the zeolite particles contain Zn ion.

9. The battery according to claim 1, wherein the sealing member contains sulfides.

10. The battery according to claim 1, wherein:
    the positive electrode includes a positive electrode current collector and a positive electrode layer disposed on the positive electrode current collector,
    the negative electrode includes a negative electrode current collector and a negative electrode layer disposed on the negative electrode current collector,
    the power generation element further includes a positive electrode terminal and a negative electrode terminal,
    the sealing member includes a first portion and a second portion,
    the solid electrolyte layer is disposed between the first portion and the second portion, and
    the positive electrode current collector passes through the first portion and is connected to the positive electrode terminal, and the negative electrode current collector passes through the first portion and is connected to the negative electrode terminal.

* * * * *